INVENTOR.
THOMAS W. NICHOLSON

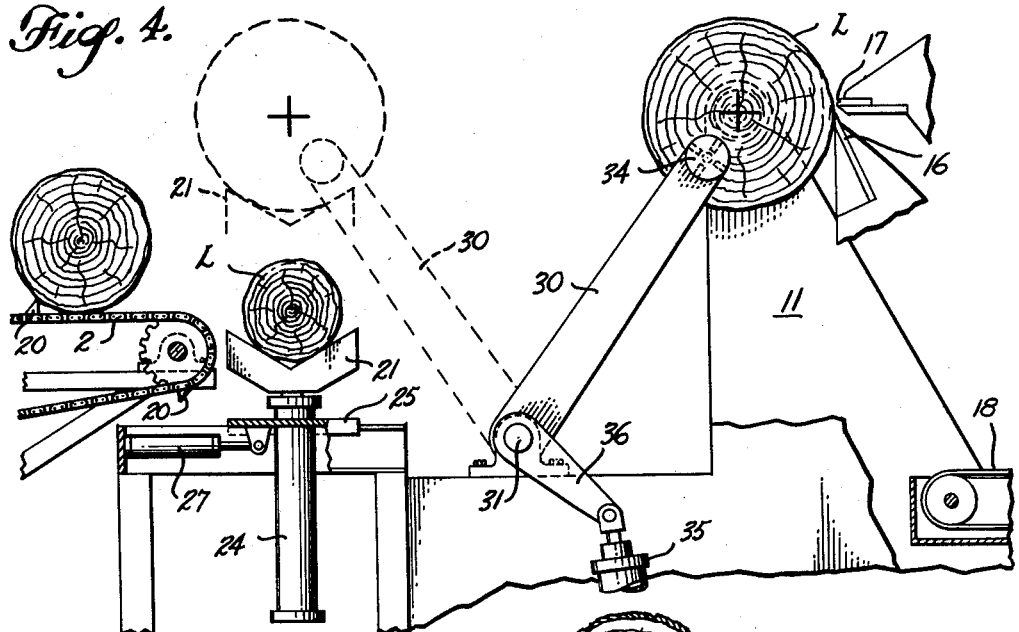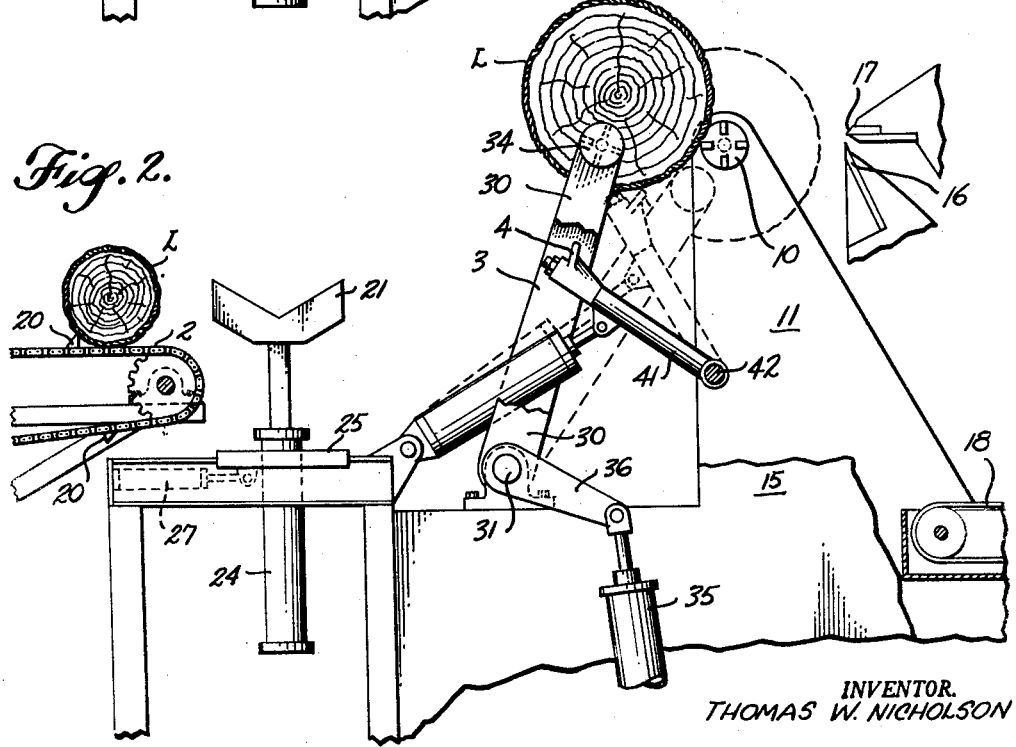

Oct. 13, 1964

T. W. NICHOLSON 3,152,626

VENEER LATHE LOADERS

Filed Sept. 28, 1956

INVENTOR.
THOMAS W. NICHOLSON
BY
Reynolds, Beach & Christensen
ATTORNEYS

Oct. 13, 1964  T. W. NICHOLSON  3,152,626
VENEER LATHE LOADERS

Filed Sept. 28, 1956  5 Sheets-Sheet 4

INVENTOR.
THOMAS W. NICHOLSON
BY
Reynolds, Beach & Christensen
ATTORNEYS

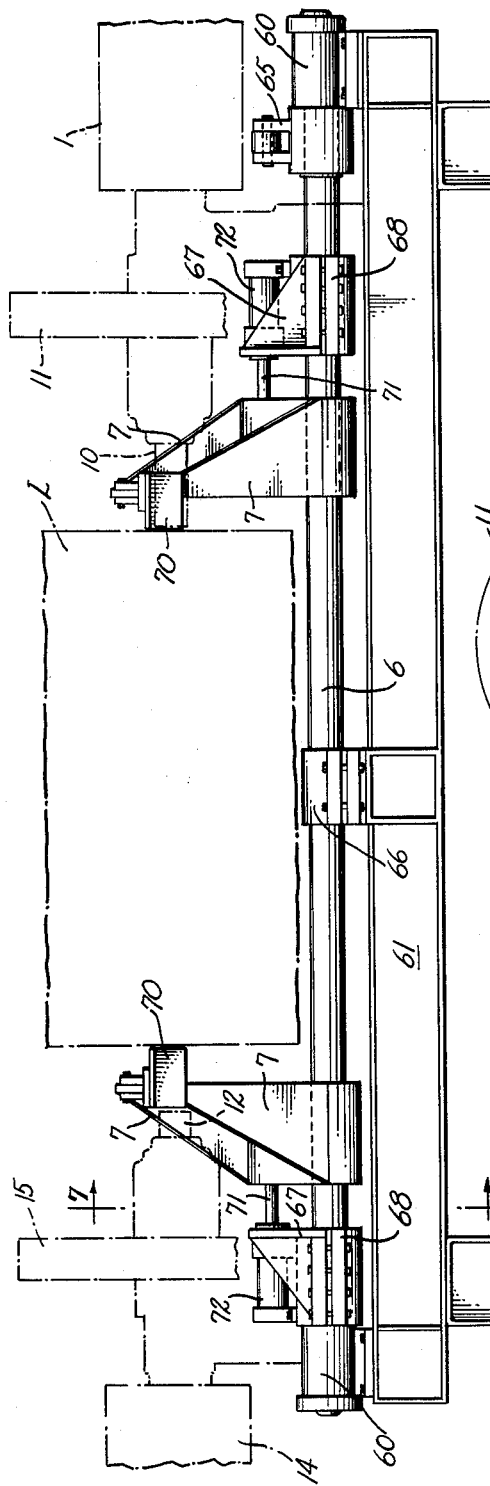

United States Patent Office 3,152,626
Patented Oct. 13, 1964

3,152,626
VENEER LATHE LOADERS
Thomas William Nicholson, P.O. Box 436, Auburn, Wash.
Filed Sept. 28, 1956, Ser. No. 612,726
3 Claims. (Cl. 144—208)

This invention relates to a device for placing a log in position to be gripped by the centers of a veneer lathe so that the log can be peeled in the manufacture of rotary cut veneer.

In the past logs of a length suitable for being received between the centers of a veneer lathe have been located close to the lathe and then have been picked up by a hoist and transported to the lathe. This handling procedure has the disadvantage that it is difficult to locate the center of the log accurately relative to the lathe centers so that the axis of the log will lie precisely in alignment with the center of rotation of the lathe centers. Such location of the log is particularly difficult because the workman controlling the hoist must stand in a position where he cannot see the surface of either end of the log, or at most can see the surface of only one end. To place the log in even approximately the correct position usually takes an appreciable amount of time, and because the log is carried by the swinging cable of the hoist assistance of a workman to position the log in even approximately the correct position frequently is required.

A principal object of the present invention is to place a log accurately and with facility between the centers of a veneer lathe to be gripped by them. In accomplishing this object the log is moved positively by rigid mechanism into position so that the log has no opportunity to swing freely out of the desired alignment.

A further object is to incorporate in the loader precision mechanism which will bear a definite, predetermined spatial relationship to the lathe centers so that the relationship of a log to the loader gripping it will determine the relationship which will be established between the lathe centers and the log when the log has been positioned in the lathe and gripped by such centers.

To expedite placement of a new log in the veneer lathe following turning of a previous log in the lathe, it is an object of the present invention to locate the new log relative to the loader gripping elements in the proper relationship at a location remote from the veneer lathe. In establishing such relationship it is an object to handle the log positively and controllably without manual assistance by a workman, while enabling the position of the log to be adjusted to the extent necessary for placing it in the veneer lathe in the best position for turning.

While the lathe loader of the present invention is effective in operation and reliable, it is of simple and rugged construction so that its operation can be controlled properly by a workman of little experience and will stand up under the heavy loads to which it is subjected.

Another object is to incorporate barking mechanism with the lathe loader which can be operated to remove the bark from a log gripped and turned by the lathe without the barking mechanism interfering with the operation of the lathe loader.

These objects may be accomplished by a lathe loader incorporating log-cradling means operable to receive a log from a supply conveyor and adjustable relative to rigid log-transfer mechanism so as to position a log carried by such cradling means in a desired position relative to the log-transfer mechanism. The log-transfer mechanism is then shifted in a prescribed manner to place the log in a predetermined position relative to the veneer lathe centers, to be gripped by them without conflict with the log loader. Log-barking mechanism is movable between a retracted position out of the path of the log- transfer mechanism and log carried by it and an operative position engaged with the log.

FIGURE 2 is an end elevation view of the log cradling means extended, the transfer mechanism shifted toward the lathe, and the barking means retracted, parts being broken away.

FIGURE 4 is an end elevation view of the log-cradling means in retracted position and the transfer mechanism locating a log in lathe-gripping position.

FIGURE 6 is a side elevation of such mechanism.

FIGURE 7 is a section of such alternative log-transfer mechanism taken on line 7—7 of FIGURE 6.

Figure 1:
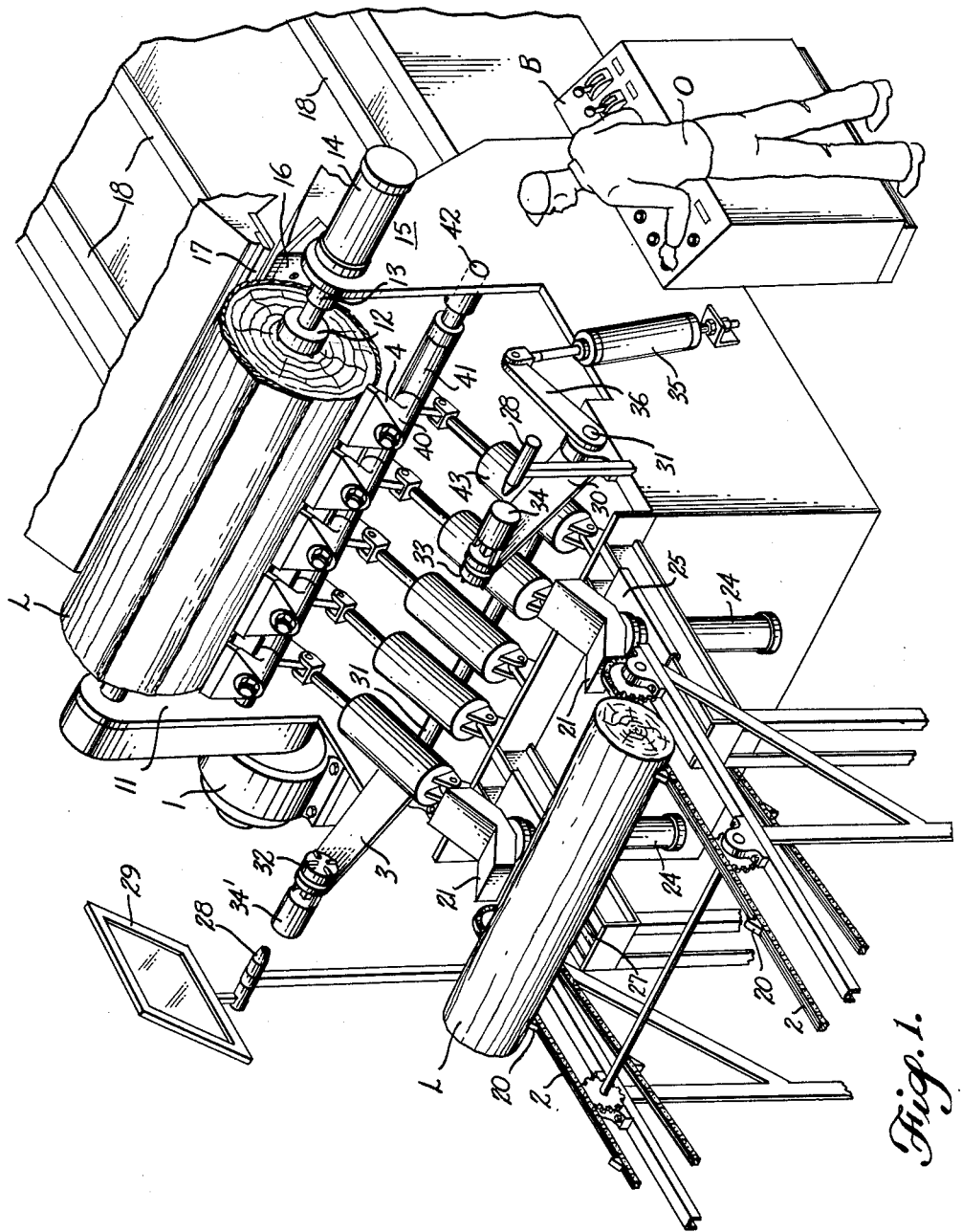
FIGURE 1 is a top perspective view of the barking mechanism in operation and the transfer mechanism retracted.

The veneer lathe shown in the several figures of the drawings is conventional, including a motor 1 operable to drive a center 10 supported by an end plate 11 and cooperating with a center 12 mounted for rotation on an axle 13. This axle is supported by a fluid-actuated piston and cylinder actuator 14 mounted on the end plate 15 for reciprocation toward and away from the center 10 for the purpose of gripping a log between such centers. In some lathes both centers can be shifted axially.

Alongside the lathe centers is the peeling blade 16 movable toward and away from the centers 10, 12 by conventional mechanism, depending upon the diameter of the log being peeled. Cooperating with this blade is the backing member 17. Veneer peeled from a log gripped by the centers 10 and 12 moves between the blade 16 and backing member 17 onto the conveyor belt 18, by which the veneer sheet is conveyed away from the log for processing.

Many logs have rather a nonuniform growth pattern so that the center of the annular ring pattern at opposite ends of the log is sometimes considerably spaced from the geometric center of the log. In peeling veneer it is desirable to have the center of rotation of the log as close as possible to the center of the annular ring pattern. With the hoisting equipment heretofore used for loading a veneer lathe, it has been difficult enough to spot the log's geometric center at its opposite ends approximately in registry with the respective centers of the veneer lathe, without worrying about whether the center of the annular ring pattern coincided approximately with the geometric center of the log end or not.

Since hoists utilized in placing logs in veneer lathes heretofore have supported the logs in freely swinging fashion, the log is usually swinging, at least to some extent, when the actuator 14 is energized to shift the dead center 12 axially for gripping the log. If the operator has poor judgement as to the relative speed of swing of the log and axial movement of the axle 13, the centers will grip the log more or less out of registry with the geometric centers of the log ends. Ordinarily the log is supported not only so that it can swing freely transversely of its length, but its opposite ends may swing independently so that frequently a log is cocked when it is gripped between the centers 10 and 12. In order not to delay the operation of the lathe usually a log is turned in the position it is first gripped between the centers even though it may be located poorly, because otherwise it is necessary to retract the center 12 to release the log, whereupon almost certainly the log will swing so that the log must be relocated before the center can be set again.

By using the mechanism of the present invention not only can much time be saved in placing the log in the veneer lathe, but the log can be placed accurately in the most advantageous position. Sufficient time can be saved by the use of such lathe-loading mechanism that it is practical to provide mechanism for barking the log while supported in the veneer lathe and before begining the veneer-peeling operation. This expedient saves the expense of installing separate log-barking mechanism and the time and labor required to set up the log for a preliminary barking operation. Moreover, by integrating the log-barking and veneer-peeling mechanism at the veneer lathe, considerable saving in the space required for handling the logs is effected, and the floor area of the plant can be reduced by that much or such space can be used for log storage or other purposes.

Logs L are moved toward the lathe by a log conveyor composed of chains 2 carrying lugs 20 disposed in spaced parallel arrangement with the lugs of the chains in registry so that a log L can be transported by such chains in a direction perpendicular to its length. Such a conveyor is of the intermittently-moving type so that when it is desired to prepare for supplying another log to the veneer lathe the conveyor chains are energized to shift a log from the position on the conveyor chains shown at the left of FIGURES 1 and 2 to the right onto the log-locating means.

Such log-locating means includes a pair of log-cradle heads 21 carried respectively by the upper ends of vertically and horizontally adjustable posts 22. These posts, as shown, may be of noncircular cross section, fitting snugly in apertures 23 of complemental noncircular shape, or guide means of some other type may be provided to rstrain appreciable rotation of posts 22 about their axes. Such apertures are located in the heads of piston-and-cylinder actuators 24, respectively, which are independently operable and the posts 22 constitute the piston rods of such actuators.

Figure 3:
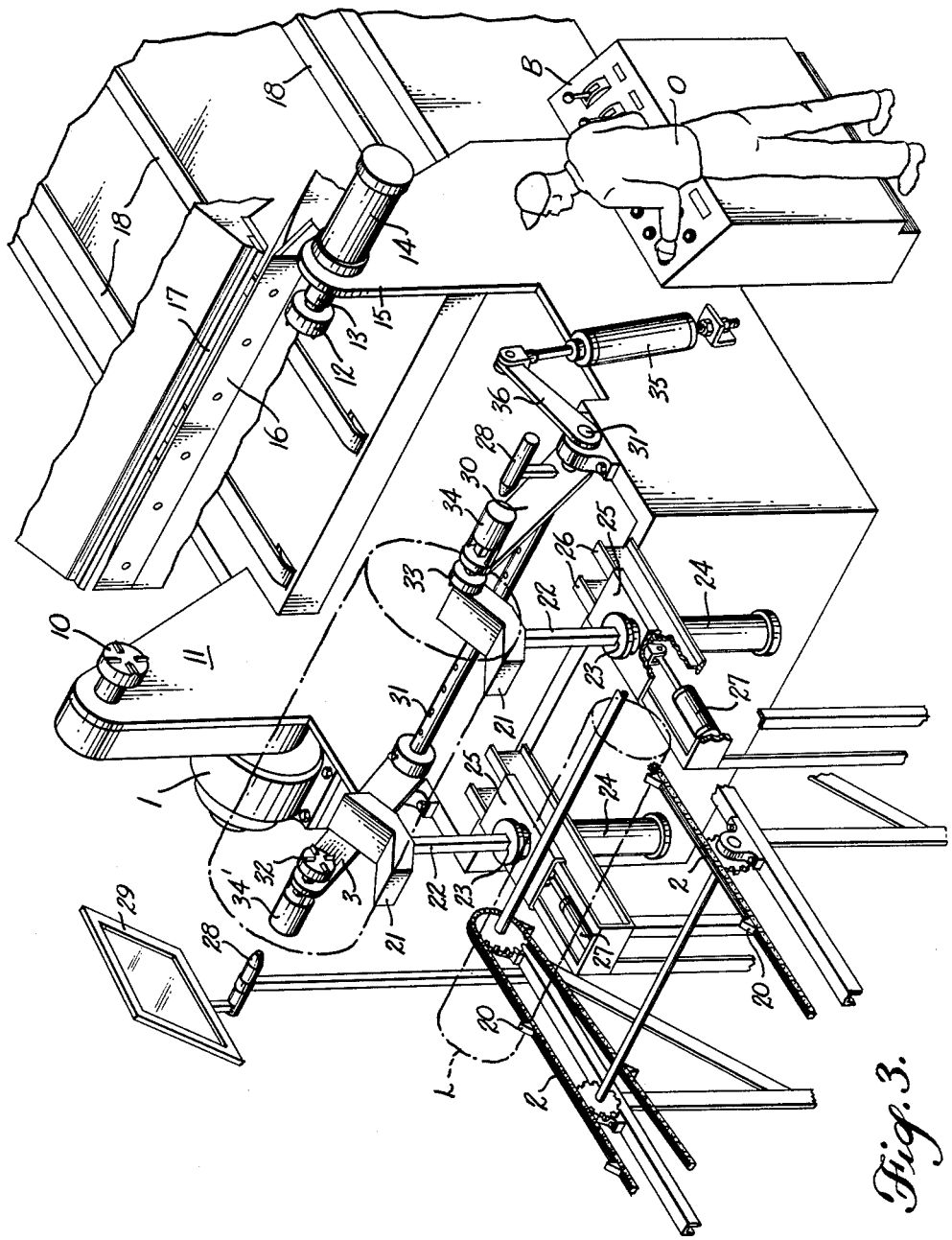
FIGURE 3 is a top perspective view of the log-cradling means extended and the transfer mechanism retracted.

By manipulation of the actuators 24, the cradle heads 21 may be moved between the lowered or retracted positions shown in FIGURES 1 and 4, and various raised or extended positions such as illustrated in FIGURES 2 and 3. The posts 22 and cradle heads 21 may also be moved independently toward and away from the log-conveyor chains 2 by mounting the upright movement post actuators 24 upon slides or carriages 25 slidable along ways 26 extending parallel to chains 2 by manipulation of the piston-and-cylinder actuators 27. The cradle heads 21 are therefore universally displaceable independently within limits in parallel upright planes which are parallel to the direction of log movement to such locating means and disposed transversely of or perpendicular to the length of the log located by such means.

As the conveyor chains 2 are moved so that their upper stretches travel to the right as seen in the drawings, a log will be delivered from such chains to the cradle heads 21 when in their lowered positions of FIGURES 1 and 4. When a log has been received on the cradle heads in the position shown in FIGURE 4, the actuators 24 and 27 for the two posts 22, respectively, may be operated independently to shift the log within limits into any desired position and alignment. In general the actuators 24 will be energized simultaneously to raise the cradle heads 21 until the log is at an elevation generally corresponding to the elevation of the lathe centers 10 and 12 and in a position generally parallel to the line joining said centers. One or the other, or both, of actuators 24 and one or the other, or both, of actuators 27 may then be manipulated to dispose the log in precisely the desired position and alignment prescribed relative to the lathe.

The precise position and alignment desired for such a log to be engaged by transfer means for movement from the log-locating means to the lathe may be indicated by suitable index or reference means. Such means may be pointing rods or fixed spotlights 28 supported in alignment at opposite sides of the desired log location. The log will have been placed in precisely the desired location when the light spots from these lights coincide exactly with the respective centers of the annular ring pattern on the opposite ends of the log. The operator O standing at the control board B may observe the projection of the nearer spot of light on the nearer log end directly, and a mirror 29 may be mounted at an angle above the location of the other log end to reflect to the operator's eye the projection of the light spot on the other end of the log, or the pointing rod location.

The transfer mechanism utilized to transfer a log from the position established by the log-locating means cradle heads 21 to the veneer lathe preferably are of rigid construction so that the log is not free to swing but is held positively and rigidly at all times. Thus held, the log may be transported along a definite predetermined path between the log-locating means and the veneer lathe, insuring that when it reaches the veneer lathe it will be held steadily in a definite predetermined position so that, upon being gripped by the centers of the lathe, it will be in the most advantageous attitude to be turned. Such transfer means include the swingable, rigid log-supporting transport arms 3 and 30 mounted on the rock shaft 31 in positions spaced lengthwise of such shaft.

Arms 3 and 30 carry log-gripping means which may take the form of clamping plates. Preferably the clamping plate 32 carried by the end of arm 3 is fixed on such arm so that its log-engaging face is substantially in the same vertical plane as the live center 10 of the veneer lathe. The log-engaging plate 33 is carried by the end of the piston rod of a piston-and-cylinder fluid pressure actuator 34 mounted on the end of arm 30. By operation of this actuator the log-engaging plate 33 may be moved toward and away from plate 32 in a direction transversely of arm 30.

The rock shaft 31 may be rocked by operation of the fluid pressure piston-and-cylinder actuator 35 which is connected to swing arm 36 secured to the rock shaft. The actuator 35 incorporates or has associated with it suitable stop means to limit its movement, and consequently the swinging of arms 3 and 30, in definite predetermined extreme positions. To minimize the load on such arms it is preferred that their extreme positions of swing be approximately equal angles at opposite sides of a vertical plane through the rock shaft 31, as indicated by the broken-line and solid-line positions of arm 30 shown in FIGURE 4. In the left extreme position of this figure a log to be loaded in the lathe can be gripped between these arms. As the arms swing from the broken-line position to the solid-line position of FIGURE 4, the log will be transferred to the veneer lathe.

It will be evident that, in order to enable the lathe centers 10 and 12 to grip the log L between them accurately, the gripping plates 32 and 33 carried by the transfer arms 3 and 30 must grip the log at positions offset from its growth center. Moreover, such offset must be sufficient so that no part of the gripping plates 32 and 33 will interfere with gripping actuation of the lathe centers 10 and 12. When the gripping plates of the transfer arms are engaged with the log, therefore, they must be positioned at locations with reference to the log's growth center corresponding to the relationship which these log-engaging plates will bear to the rotative axis of lathe centers 10 and 12 when the arms 3 and 30 have been swung to their full-line limiting positions shown in FIGURE 4.

The proper relationship between the log and the log-engaging plates 32 and 33 is established by placing the lights 28 in the proper position relative to the respective plates 32 and 33 when the log-transfer arms 3 and 30 are in the full-line positions of FIGURES 1 and 3 or the broken-line positions of FIGURE 4. Lights 28 may be properly positioned most readily if, as suggested above, the arms 3 and 30 swing between extreme limiting positions defining equal angles at opposite sides of a vertical plane through the axis of rock shaft 31. In one extreme position the rotative axis of the lathe centers 10 and 12 is in the same plane as the arms, and in the other extreme position the line joining lights 28 is in the same plane as the arms, and further the distance between the center of shaft 31 and the rotative axis of lathe centers 10 and 12 is the same as the distance between the center of shaft 31 and the line joining the beams from lights 28.

With the swing of arms 3 and 30 thus limited when the growth centers at opposite ends of the log coincide respectively with the light spots projected by lights 28 and in that position a log has been gripped between the log-engaging plates 32 and 33 by operation of the actuator 34, the plane passing through the axis of shaft 31 and the centers of log-engaging plates 32 and 33 will also be a radial plane of the log through its growth centers. When the arms are swung by actuator 35 to the other extreme position, the centers of lathe centers 10 and 12 will register with the exact locations on the log ends on which the beams from lights 28 were projected when the log-gripping plates of the log-transfer means were engaged with the log. To obtain such accuracy of log placement in the veneer lathe, therefore, it is merely necessary to raise and lower the log-cradling heads 21 independently and to shift the slides 25 independently as may be necessary to coordinate the light spots projected by the lights 28 with the annular ring growth centers at the opposite ends of the log.

The cradles 21 of the log-locating means are manipulated until the log has been located in exactly the correct position before it is engaged by the gripping plates 32 and 33 of the log-transfer mechanism. The arms can then lift the log into a position between the log-locating means and the lathe until turning of a log has been completed and the core has been released from the lathe, and thereupon the log held by the arms can immediately be swung into exactly the proper position to be gripped by the centers 10 and 12 of the veneer lathe without any hesitancy or hunting, and without any manual assistance by a workman. As soon as the veneer lathe centers have been actuated to grip the log, the actuators 34 and 34' will be released. The transfer arms are entirely separate from the log-locating means so that, while the log is held by the arms 3 and 30 awaiting completion of the peeling operation, another log will have been placed in the cradles 21 which will be shifted to locate the log in position to be gripped by the transfer arms just as soon as they have placed in the lathe the log held by them.

Particularly with such a rapidly operating veneer lathe loader as described above it will usually be possible for the veneer lathe to be operated to peel veneer from logs faster than the veneer can be handled subsequently. Consequently, it is quite practical to bark the log after it has been loaded into the veneer lathe and before the peeling knife 16 is engaged with the log, instead of the barking operation being accomplished as a separate preliminary operation as is customary. It is preferred that the barking mechanism be located at the side of the veneer lathe opposite the peeling knife 16, as shown in FIGURES 1 and 2, which side is adjacent to the log-loading mechanism described above. It is necessary, therefore, to retract the barking mechanism from log-engaging position during a lathe-loading operation by the loading mechanism.

While the barking operation could be accomplished by a single barking tool traversed along the length of the log as the log is rotated many turns, the barking can be completed in a single rotation of the log, or in not more than a few turns, by a gang of barking tools arranged along the length of the log. Preferably the barking tools in such a gang are aligned in a row. In the barking mechanism illustrated in FIGURES 1 and 2 the barking tools 4 are carried by pivoted heads 40, respectively. Each of such heads is swiveled on an arm 41, and such arms are independently pivoted on a shaft 42.

Five barking heads 40 are shown and the tools are of the scraper plate type. Each scraper plate edge, therefore, would be about eighteen inches in length if only five heads were provided for barking a log approximately one hundred inches in length. The number of barking elements could be increased, however, and their width decreased correspondingly, if desired. Each of the arms 41 is swung independently of the other arms on shaft 42 by a fluid pressure piston-and-cylinder actuator 43 reacting between the barker arm and the lathe frame. By contraction of such actuator the corresponding arm 41 can be swung into the full-line retracted position shown in FIGURE 2, clear of the arcuate path of movement of a log being transferred by the transfer arms 3 and 30 from the log-locating mechanism to the veneer lathe.

After the log has been gripped by the veneer lathe centers, and preferably after the log-transfer arms 3 and 30 have been retracted to the broken-line position of FIGURE 4, the barking means may be actuated to effect the barking operation. The arms 3 and 30 may, if desired, be spaced apart far enough so that the barking operation can be started before these arms are retracted. In barking the log each arm 41 will be swung by extension of its actuator 43 to engage with the log the barking tool which such arm carries. During the barking such actuator will exert sufficient resilient pressure on the arm to effect the barking operation efficiently, and yet the resilience afforded by such actuators will enable every barking tool to be pressed away from the log center as may be necessary to enable a projection or other eccentric irregularity of the log to pass the barking tool without excessive resistance.

If the resistance to rotation of the log produced by the barking tools in removing the bark completely from the log in a single rotation of it is too great for the live lathe center driving mechanism or the grip of such centers on the log, the pressure exerted by the actuators 43 may be reduced so that only a portion of the bark thickness of the log will be scraped off during each turn of the log, and the log will be turned through several rotations in order to remove the bark completely from it. After completion of the bark removal the actuators 43 will be operated to retract the barking arms into the positions shown in solid lines in FIGURE 2, after which the peeler blade 16 will be shifted toward the rotative axis of the log to peel the log into veneer.

The several actuators 24, 27, 34 and 35 have been described as fluid-pressure piston-and-cylinder actuators, and it is preferred that such actuators be of the pneumatic type, as are the barking member actuators 43. Except for such actuators 43, however, the other fluid pressure actuators, or any of them, may be of the hydraulic type if preferred.

Figure 5:
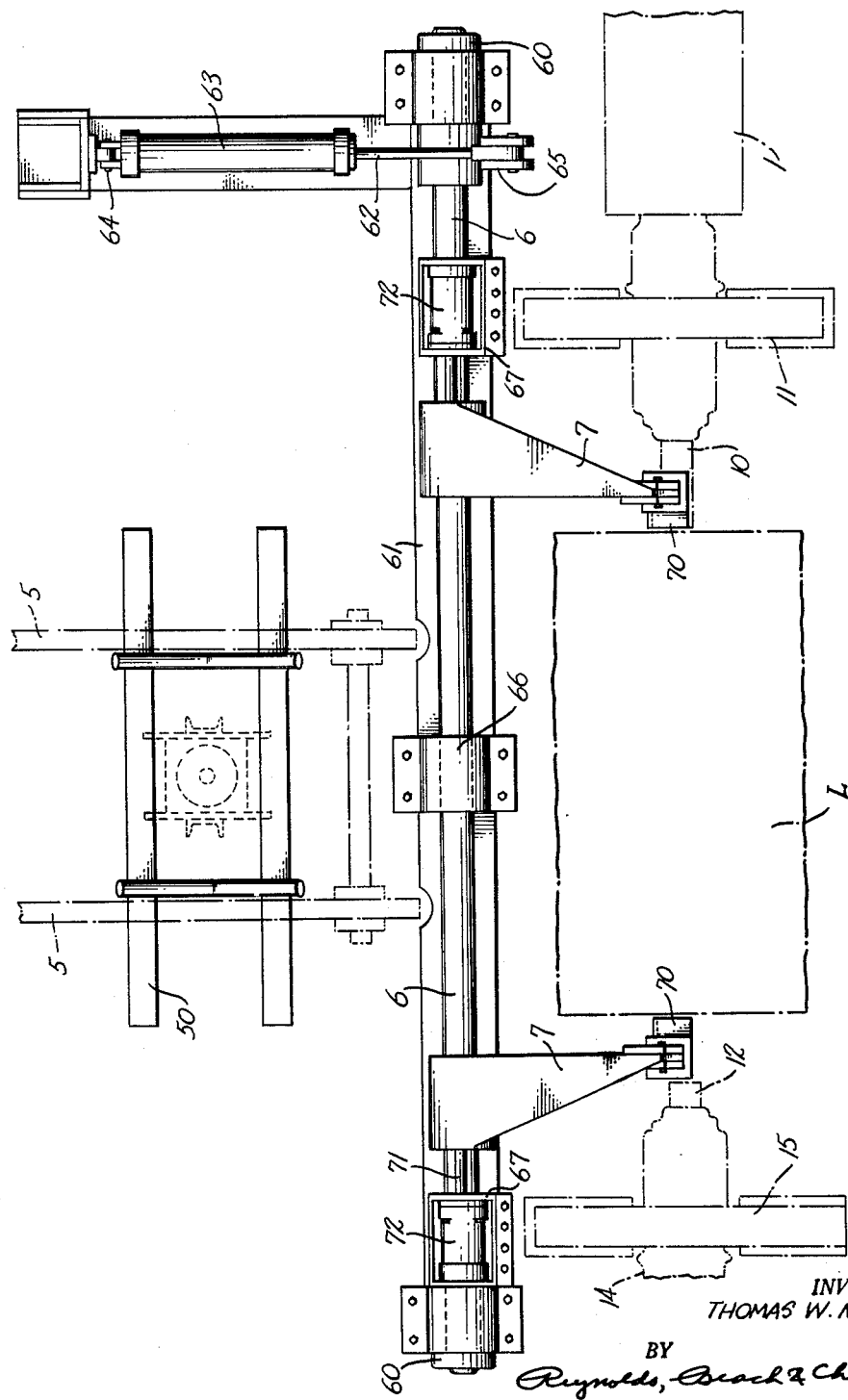
FIGURE 5 is a plan view of alternative log-transfer mechanism locating a log in lathe-gripping position.

In FIGURES 5, 6 and 7 an alternative type of swinging arm log-transfer mechanism is shown. In this instance the log conveyor 5 travelling transversely to the length of the log L will deposit such log on log-locating cradle mechanism 50. This cradle mechanism is movable vertically by the piston-and-cylinder actuator 51 shown in FIGURES 5 and 7. Such actuator may be employed to raise the cradling mechanism to any desired height within predetermined limits for the purpose of locating the log L with its center at a desired elevation. The log-transfer mechanism is located between this log-cradling mechanism and the veneer peeling lathe shown in phantom including the live lathe center 10 driven by the motor 1, the dead center 12 reciprocable by the actuator 14, and the respective supporting plates 11 and 15. Such lathe structure is conventional and will be generally similar to that illustrated in FIGURES 1 to 4, inclusive.

The log-transfer mechanism of FIGURES 5, 6 and 7 includes the main supporting shaft 6 having bearings 60 on the supporting frame 61 mounting its opposite ends rotatively. This entire shaft can be swung between extreme limiting positions by the fluid pressure actuator incorporating the piston rod 62 reciprocable by the cylinder 63. One end of such actuator is carried by the pivot 64 on the supporting framework 61 as shown in FIGURE 5 and the other end is pivotally connected to the crank arm 65 which is secured on shaft 6 preferably near one end as shown in FIGURES 5 and 6. The central portion of shaft 6 may also be supported directly from the frame 61 by a bearing 66 to prevent sagging of the shaft.

A log L is supported by arms 7 having apertured bases rotatably and slidably fitted on shaft 6. These arms are slidable toward and away from each other on the shaft for the purpose of setting log-engaging elements 70 into the end of a log resting on the log-cradling means. The log-engaging means 70 preferably are in the form of a V-shaped trough which will fit closely around the area in which the lathe centers 10 and 12 engage the log when the arms 7 have been swung into the positions shown in solid-lines in FIGURES 5, 6 and 7.

The arms 7 are slid along the shaft 6 to engage the members 70 with the log by piston-and-cylinder actuators including the piston rods 71 which are engaged with the arms 7, respectively, and are reciprocated by fluid under pressure in cylinders 72. These cylinders are mounted on supports 67 having bases 68 which are clamped securely to the shaft 6 in desired positions along it. The spacing of the supports 67 lengthwise of shaft 6 will depend upon the length of the logs engaged by the heads 70 and the stroke of the piston rods 71. The supports 67 should be located so that when the piston rods have been moved fully outward the log-engaging members will be closer tobether than the length of the log L. The supports must be far enough apart, however, so that when the piston rods 71 are retracted the space between the members 70 will appreciably exceed the elngth of the log L so that there will be ample clearance for easy reception of the log between the members 70.

The log conveyor 5 will be located generally centrally between the heads 10 and 12 of the veneer peeling lathe as shown in FIGURE 5. The logs can be placed on the conveyor 5 and consequently on the cradling means 50 so that the ends of the log are approximately even with the position of the lathe centers 10 and 12 in log-gripping position in directions transversely of the log. The supports 67 should be located lengthwise of shaft 6 in positions to dispose the arms 7 for engagement of their heads 70 with the opposite ends of such a log.

When the piston rod 62 is retracted into cylinder 63 the crank lever 65 will be swung to rotate shaft 6 to place arms 7 in the broken-line positions shown in FIGURE 7. When in that position initially, the piston rods 71 will be retracted into the cylinders 72 so that the arms 7 and heads 70 are spaced apart their maximum distances. The centers of such heads will be located directly above the center of cradling means 50 as shown in FIGURE 7. Such cradling means can be raised or lowered until a log carried by the cradling means is located properly relative to the arms 7, namely so that the growth center is disposed slightly above the V-shaped head. The cylinders 72 are then supplied with fluid under pressure to move arms 7 toward each other and set the heads 70 in the opposite log ends. Fluid under pressure is supplied to cylinder 63 to swing the arms 7 from the broken-line position to the solid-line position of FIGURE 7 and the heads engaged with the log ends will carry the log into the proper position for engagement by the lathe centers 10 and 12.

Swinging of the arms 7 may be controlled so that the arms will occupy definite predetermined limiting positions when swung in each direction. Such limiting positions may be determined either by stop-means engaged by the arms or by the piston rod 62 reaching opposite ends of its stroke. If necessary, the piston rods 71 may be shifted by cylinders 72 when in lathe loading position in order to shift the log lengthwise for engagement with lathe center 10 while lathe center 12 may be moved toward the right as seen in FIGURE 5 into engagement with the other end of the log. As soon as the log has been gripped by the lathe centers the cylinders 72 may be supplied with fluid under pressure to retract the piston rods 71 to free the log-engaging heads 70 from the log ends. Fluid under pressure then supplied to cylinder 63 will retract piston rod 62 to swing the arms away from the log set in the lathe and into position to grip the next log carried by the cradling means 50 to be transferred to lathe.

I claim as my invention:

1. Veneer lathe loading mechanism comprising two stationary light sources spaced apart a distance greater than the length of a log to be loaded into the veneer lathe and directing beams of light toward each other along a line parallel to the axis of such veneer lathe, two log-cradling heads spaced apart lengthwise of a log supported thereby to be loaded into the veneer lathe, posts supporting said log-cradling heads, respectively, means supporting said posts parallel to a plane which is parallel to the line of such light beams and operable to move said posts vertically independently of each other and guiding said posts for movement horizontally in a direction transverse to such plane, means operable to move said cradling heads transversely of such plane relative to said stationary light sources, respectively, until such light beams form light spots on the log ends in desired positions, a pair of parallel transfer arms spaced apart a distance somewhat greater than the length of a log supported by said log-cradling heads, a log-engaging means carried by each of said arms, means operable to effect relative approach movement of said log-engaging means to engage the respective ends of a log carried by said log-cradling heads at locations offset from such light spots means supporting said arms for conjoint swinging about an axis parallel to the axis of the veneer lathe in such parallel relationship to transfer a log from said log-cradling heads to the veneer lathe, such axis of said supporting means being located equidistant from the line of said light beams and the axis of such veneer lathe, means operable to effect such swinging of said arms, and means operable to arrest movement of said arms in each of two extreme positions, in one of such extreme positions said log-engaging means being a position relative to the axis of the lathe corresponding to the relationship of said log-engaging means to such light spots when said arms were in the other of such extreme positions, to dispose the log carried by said arms in position for gripping by the lathe with the locations of its ends which were illuminated by the light spots in registry with the lathe's axis, said log-engaging means being movable into engagement with the log ends when said arms are in such other of such extreme positions.

2. Veneer lathe loading mechanism comprising two stationary light sources disposed at the same elevation, spaced apart a distance slightly greater than the length of a log to be loaded into the veneer lathe and directing beams of light toward each other along a line parallel to the axis of the veneer lathe, two log-cradling heads spaced apart lengthwise of a log supported thereby, posts supporting said log-cradling heads, respectively, means supporting said posts parallel to an upright plane which is parallel to the line of such light beams, restraining rotation of said posts about their axes, operable to move said posts vertically independently of each other, and guided for movement in a direction transverse to such upright plane for moving said heads relative to said stationary light sources, respectively, vertically and horizontally until such light beams form light spots on the log ends in desired positions, a pair of parallel transfer arms spaced apart a distance somewhat greater than the length of a log supported by said log-cradling heads, a log-engaging plate carried by each of said arms, means operable to effect relative approach movement of said plates to engage the respective ends of a log carried by said log-cradling heads at locations offset from such light spots, means supporting said arms for conjoint swinging about an axis parallel to the axis of the veneer lathe in such parallel relationship to transfer a log from said log-cradling heads to the veneer lathe, such axis of said supporting means being located equidistant from the line of said light beams and the axis of such veneer lathe, means operable to effect such swinging of said arms, and means operable to arrest movement of said arms in each of two extreme positions, in one of such extreme positions said log-engaging plates being in positions relative to the axis of the lathe corresponding to the relationship of said log-engaging plates to such light spots when said arms were in the other of such extreme positions, to dispose the log carried by said arms in position for gripping by the lathe with the locations of its ends which were illuminated by the light spots in registry with the lathe's axis, said log-engaging plates being movable into engagement with the log ends when said arms are in such other of such extreme positions.

3. The veneer lathe loading mechanism defined in claim 2, and a gang of barker heads arranged in a row extending lengthwise of a log gripped by the veneer lathe, a swingable barker arm carrying each of said barker heads, and fluid pressure actuators connected to said respective barker arms and operable to swing them individually to effect movement of said barker heads between a retracted position out of the path of movement of a log being moved by the transfer arms and an operative position engaging the barker heads with a log gripped by the veneer lathe.

References Cited in the file of this patent

UNITED STATES PATENTS

| | | |
|---|---|---|
| 1,670,657 | Friede | May 22, 1928 |
| 2,325,121 | Freeman | July 27, 1943 |
| 2,425,750 | McCarty | Aug. 19, 1947 |
| 2,453,947 | Swift | Nov. 16, 1948 |
| 2,523,563 | Foreman | Sept. 26, 1950 |
| 2,546,524 | Schipplock | Mar. 27, 1951 |
| 2,689,590 | Witaker | Sept. 21, 1954 |
| 2,801,812 | Coulter | Aug. 6, 1957 |
| 2,802,496 | Nicholson | Aug. 13, 1957 |
| 2,802,586 | Wingard | Aug. 13, 1957 |
| 2,931,403 | Parker | Apr. 5, 1960 |

FOREIGN PATENTS

| | | |
|---|---|---|
| 218,457 | Great Britain | July 10, 1924 |
| 141,446 | Australia | June 4, 1951 |
| 25,736 | Finland | Feb. 26, 1953 |
| 1,100,000 | France | Mar. 30, 1955 |

OTHER REFERENCES

Article entitled "Tooling up by Telescope," on pp. 120–123 of Fortune, October 1951.

German printed application E5786 Ib–38i, Aug. 2, 1956, applicant: Enso-Gutzeit Osakeyhtio.

"The Timberman," January 152 issue, p. 95, advertisement by Ederer Co.

Bulletin No. V–104, published by the Ederer Co., January 1952.